United States Patent [19]

Boyd et al.

[11] Patent Number: 5,019,703

[45] Date of Patent: May 28, 1991

[54] OPTICAL SCANNER WITH MIRROR MOUNTED OCCLUDING APERTURE OR FILTER

[75] Inventors: David W. Boyd, Greeley; John S. Deutschbein, Longmont, both of Colo.

[73] Assignee: Hewlett-Packard Company, Palo Alto, Calif.

[21] Appl. No.: 471,156

[22] Filed: Jan. 25, 1990

[51] Int. Cl.$^5$ .............................................. H01J 40/14
[52] U.S. Cl. ............................. 250/208.1; 250/237 R; 358/497
[58] Field of Search ..................... 250/234–236, 250/237 R, 208.1; 350/642; 358/497

[56] References Cited

U.S. PATENT DOCUMENTS

| | | | |
|---|---|---|---|
| 4,547,663 | 10/1985 | Kitagishi et al. | 250/237 R |
| 4,547,813 | 10/1985 | McGraw et al. | 250/237 R |
| 4,709,144 | 11/1987 | Vincent . | |
| 4,725,729 | 2/1988 | Morizumi | 250/237 R |
| 4,839,514 | 6/1989 | Mine et al. | 250/237 R |
| 4,870,268 | 9/1989 | Vincent et al. . | |

OTHER PUBLICATIONS

PC World, May 1988, pp. 154 and 155.

*Primary Examiner*—David C. Nelms
*Assistant Examiner*—K. Shami

[57] ABSTRACT

An optical scanner device for producing machine-readable data representative of an image of a scan line object, comprising: a light source for illuminating the scan line object; a lens assembly for focusing imaging light received from the scan line object on an image plane; at least one mirror having a planar mirror surface for reflectively directing imaging light from the scan line object into the lens assembly whereby a folded imaging light path extending between the scan line object and the lens assembly is provided; and an occluding aperture stop positioned in immediately adjacent, overlying relationship with the mirror surface for selectively differentially blocking light in the light path emanating from different points across the scan line object for adjusting the light intensity of the image produced on the image plane whereby blocking of light with the occluding aperture stop at more than one location along the folded imaging light path is obviated. Alternative embodiments utilizing a gradient filter and a shaped mirror surface are also disclosed.

13 Claims, 6 Drawing Sheets

OPTICAL SCANNER WITH MIRROR MOUNTED OCCLUDING APERTURE OR FILTER

BACKGROUND OF THE INVENTION

The present invention relates generally to optical scanners and, more particularly, to occluding aperture stop components of optical scanners having folded light paths.

Optical scanners are used to produce machine-readable data which is representative of a scanned object, e.g. a page of printed text. Optical scanners employ line-focus systems to image scanned objects.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor produces a data signal which is representative of the light intensity which it experiences. All of the photoelement data signals are received and processed by an appropriate data processing system. In an optical scanning device, the illuminated line object of the line-focus system is commonly referred to as a "scan line."

Optical scanners and various components thereof are disclosed in U.S. Pat. application Ser. No. 383,463, filed July 20, 1989, for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; and U.S. Pat. No. 4,870,268 for COLOR COMBINER AND SEPARATOR AND IMPLEMENTATIONS of Kent J. Vincent and Hans D. Neuman, which are each hereby specifically incorporated by reference for all that is disclosed therein.

A problem experienced in most line-focus systems is that the light intensity of the line image produced at the linear photosensor array is not uniformly proportional to the light intensity at the line object. Generally, if a line object is evenly illuminated across its length, the light intensity at the sensor is much brighter in the area corresponding to the center of the line object than in the areas corresponding to the ends of the line object. This effect is quite significant; the intensity at the line image center may be roughly twice the intensity as that at the ends. There are several different optical effects which produce this problem. These optical effects are due mainly to the different distances of the various points on the line object from the central axis of the lens.

It is known in the prior art relating to line-focus systems to utilize an aperture stop positioned in the light path between a line object and a photosensor to differentially occlude light in the light path extending between the line object and the photosensor. Such "occluding" or "compensating" aperture stops are designed to partially block a proportionally greater portion of the light at the center of the light path than at the ends so as to make the light intensity at the photosensor uniformly proportional to the light intensity at the line object. Methods for determining the appropriate shape for such an occluding aperture stop are disclosed in U.S. Pat. application Ser. No. 389,033 filed Aug. 3, 1989, for METHOD OF DETERMINING APERTURE SHAPE of David Wayne Boyd, which is hereby specifically incorporated by reference for all that it discloses.

In some optical scanners, such as described in U.S. Pat. application Ser. No. 389,033 referenced above, the scanner light source, the focusing lens assembly, and the optical sensor are all contained in a movable carriage assembly. The imaging light path extending between the scanned object and the scanner lens is generally "folded" by one or more mirrors in order to reduce the carriage size needed to accommodate the light path. The different folded portions of the light path are often positioned quite close together and in many cases overlap with adjacent light path portions along a significant portion of the light path length.

The imaging light path generally increases in thickness and decreases in width as it approaches the lens, thus the size of an occluding aperture stop which is to be provided in the scanner light path is dependent upon the position along the light path at which it is mounted. The relative effectiveness of an occluding aperture stop is, for a number of reasons, also dependent upon its position along the light path. An occluding aperture stop positioned next to the line object would theoretically be the most effective. However, at such a location the occluding aperture stop would be so small as to make fabrication and accurate positioning extremely difficult, and thus such an aperture position is generally not practical. An aperture stop positioned next to the scanner lens is the least effective position and is thus not desirable. As a result, it is usually desirable to position an occluding aperture stop at a mid-region of the light path. However, in scanners having folded light paths, it is often difficult or impossible, at a mid-region of the light path, to position an occluding aperture stop in one folded light path portion without causing the aperture stop to also extend into an adjacent folded light path portion.

SUMMARY OF THE INVENTION

The scanning device of the present invention is adapted to obviate problems associated with the use of occluding aperture stops in optical scanning devices of the type having folded light paths. The problems arise from the fact that it is often desirable to provide an aperture stop an an intermediate position along the imaging light path extending between a scan line object and a lens assembly of a scanning device. However, in many folded-path-type scanning devices, adjacent folded portions of the light path are positioned in such close relationship (in some cases overlapping relationship) that an aperture stop positioned in one folded light path portion must also undesirably impinge on an adjacent folded light path portion. This problem is eliminated in the present invention by mounting the occluding aperture stop directly on a mirror which is used to fold the light path. As an alternative to using a mirror mounted aperture stop, a gradient filter is directly mounted on the surface of a light folding mirror. As a second alternative, a light folding mirror is itself provided with a predetermined shape adapted to differentially transmit light across the light path to provide light intensity adjustment of an image.

Thus, the invention may comprise an optical scanner device for producing machine-readable data representative of an image of a scan line object, comprising: (a) a light source for illuminating the scan line object; (b) a lens for focusing imaging light received from the scan line object on an image plane; (c) at least one mirror having a planar mirror surface for reflectively directing imaging light from the scan line object into the lens whereby a folded imaging light path extending between the scan line object and the lens is provided; and (d) an occluding aperture stop positioned in immediately adjacent, overlying relationship with the mirror surface for selectively differentially blocking light in the light path emanating from different points across the scan line object for adjusting the light intensity of the image produced on the image plane whereby blocking of light with the occluding aperture stop at more than one location along said folded imaging light path is obviated.

The invention may also comprise an optical scanner device for producing machine-readable data representative of an image of a scan line object, comprising: (a) a light source for illuminating the scan line object; (b) a lens for focusing imaging light received from the scan line object on an image plane; (c) at least one mirror having a planar mirror surface for reflectively directing imaging light from the scan line object into a lens whereby a folded imaging light path extending between the scan line object and the lens is provided; and (d) an occluding gradient filter applied directly to the mirror surface for selectively differentially filtering light emanating from different points across the scan line object for adjusting the light intensity of the image provided on the image plane whereby filtering of light with the gradient filter at more than one location along the folded imaging light path is obviated.

The invention may also comprise an optical system for producing an image of a scan line object on an image plane comprising: (a) a light source for illuminating the scan line object; (b) a lens for focusing an image of the scan line object on an image plane; and (c) a shaped mirror surface of a predetermined surface configuration for folding an imaging light path extending between the scan line object and lens and for differentially transmitting light in the imaging light path emanating from different points on the scan line object for adjusting the intensity of the image on the image plane.

The invention may also comprise a method of controlling light intensity of an image produced on a linear photosensor array in an optical scanning system, comprising: (a) configuring a reflective mirror surface in a selected shape adapted to discriminatingly transmit imaging light emanating from different spacial locations on a scan line object in accordance with predetermined light transmitting properties of the optical scanning system so as to properly balance the light intensity of an image produced at the linear photosensor array; (b) directing imaging light onto the reflective mirror surface; and (c) focusing imaging light reflected from the reflective mirror surface on the linear sensor array.

The invention may also comprise a method of controlling light intensity of an image produced on a linear photosensor array in an optical scanning system, comprising: (a) applying to a reflective mirror surface a gradient filter which is adapted to discriminatingly filter light emanating from different spacial locations on a scan line object in accordance with predetermined light transmitting properties of the optical scanning system so as to properly balance the light intensity of an image produced at the linear photosensor array; (b) directing imaging light through the gradient filter and onto the reflective mirror surface to which the gradient filter has been applied; and (c) focusing the imaging light reflected from the reflective mirror surface on the linear sensor array.

BRIEF DESCRIPTION OF THE DRAWINGS

An illustrative and presently preferred embodiment of the invention is shown in the accompanying drawings in which.

DETAILED DESCRIPTION OF THE INVENTION

Figure 3:
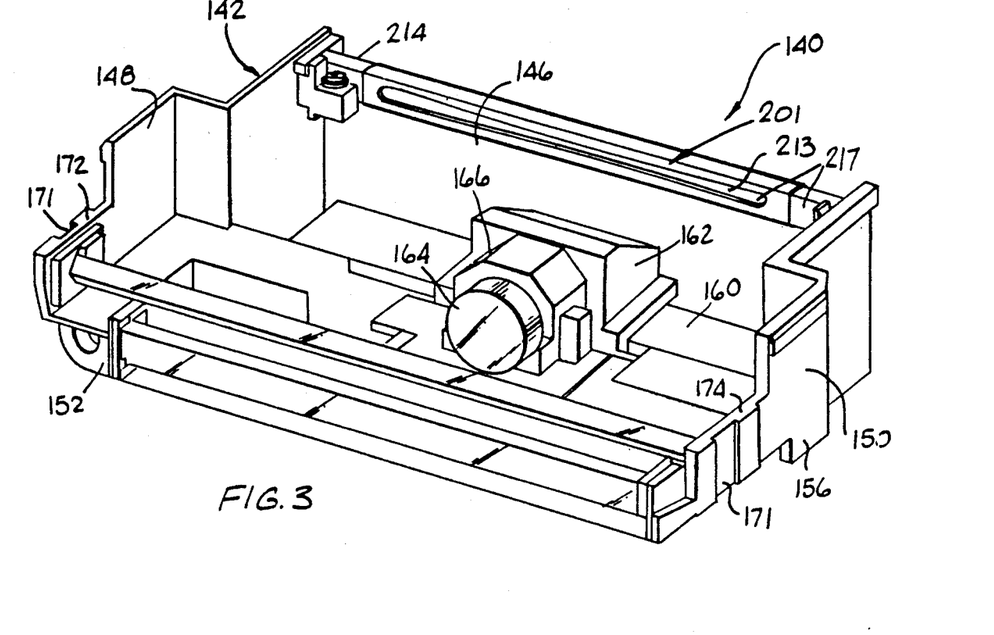
FIG. 3 is a perspective view of an optical scanner carriage assembly with a modular light source and light slit assembly removed therefrom.
Figure 4:
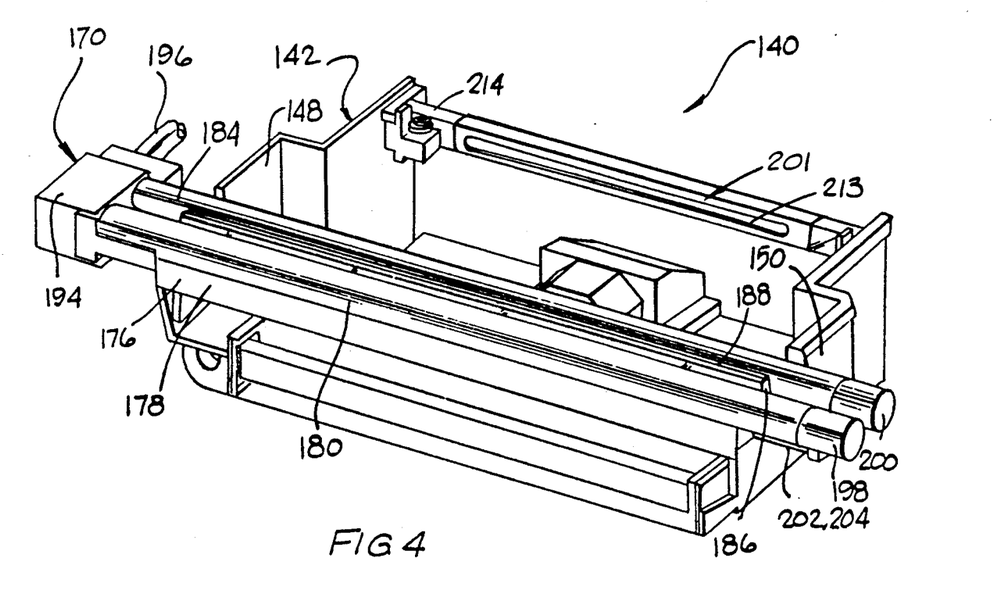
FIG. 4 is a perspective view of an optical scanner carriage assembly.
Figure 5:
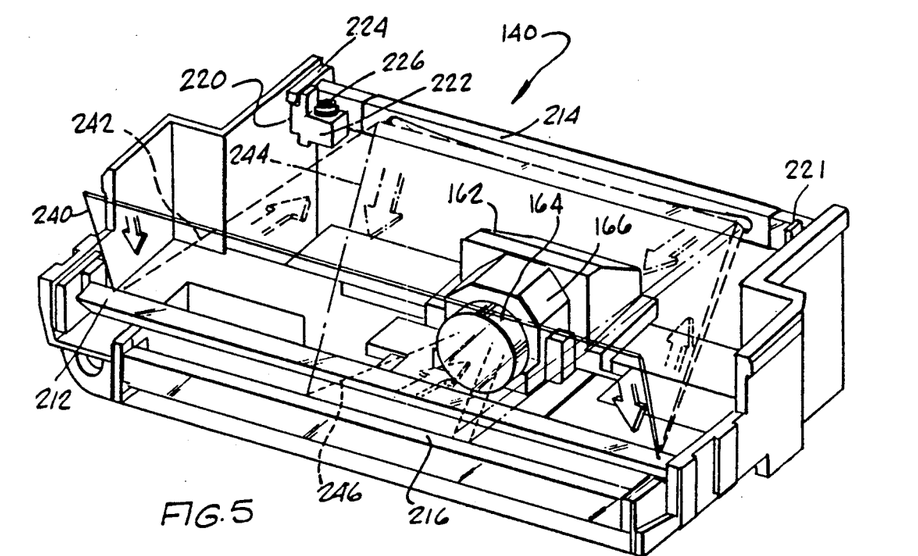
FIG. 5 is a perspective view of an optical scanner carriage assembly with a modular light source and light slit assembly removed therefrom, illustrating a fixed, folded light path which extends from a light slit to a focusing lens.
Figure 6:
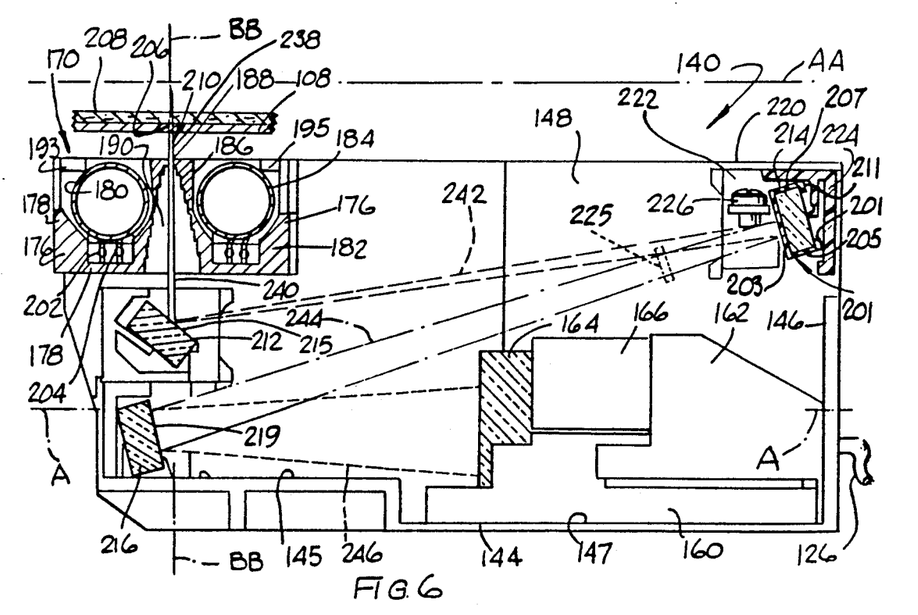
FIG. 6 is a cross-sectional elevation view of an optical scanner carriage assembly illustrating a fixed, folded light path extending from a light slit to a focusing lens.
Figure 7:
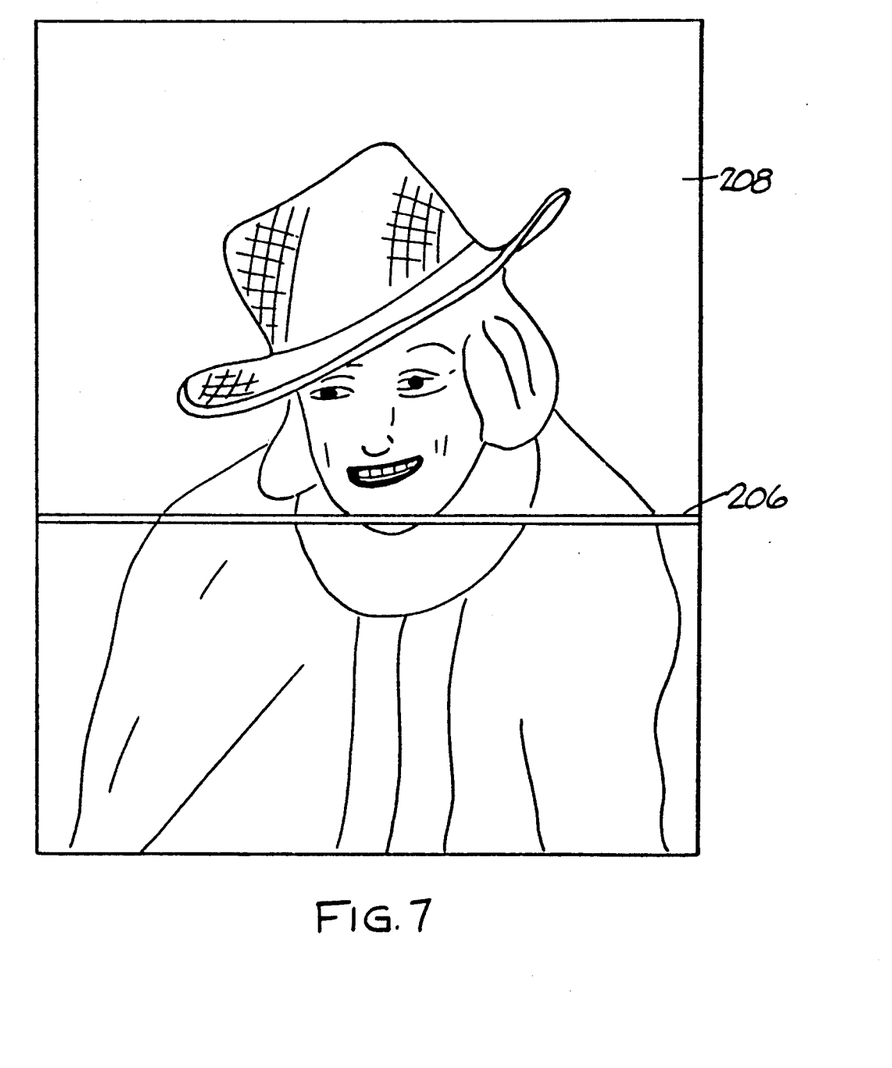
FIG. 7 is a plan view of a document which is scanned by an optical scanner and a scan line produced by the scanner.
Figure 8:
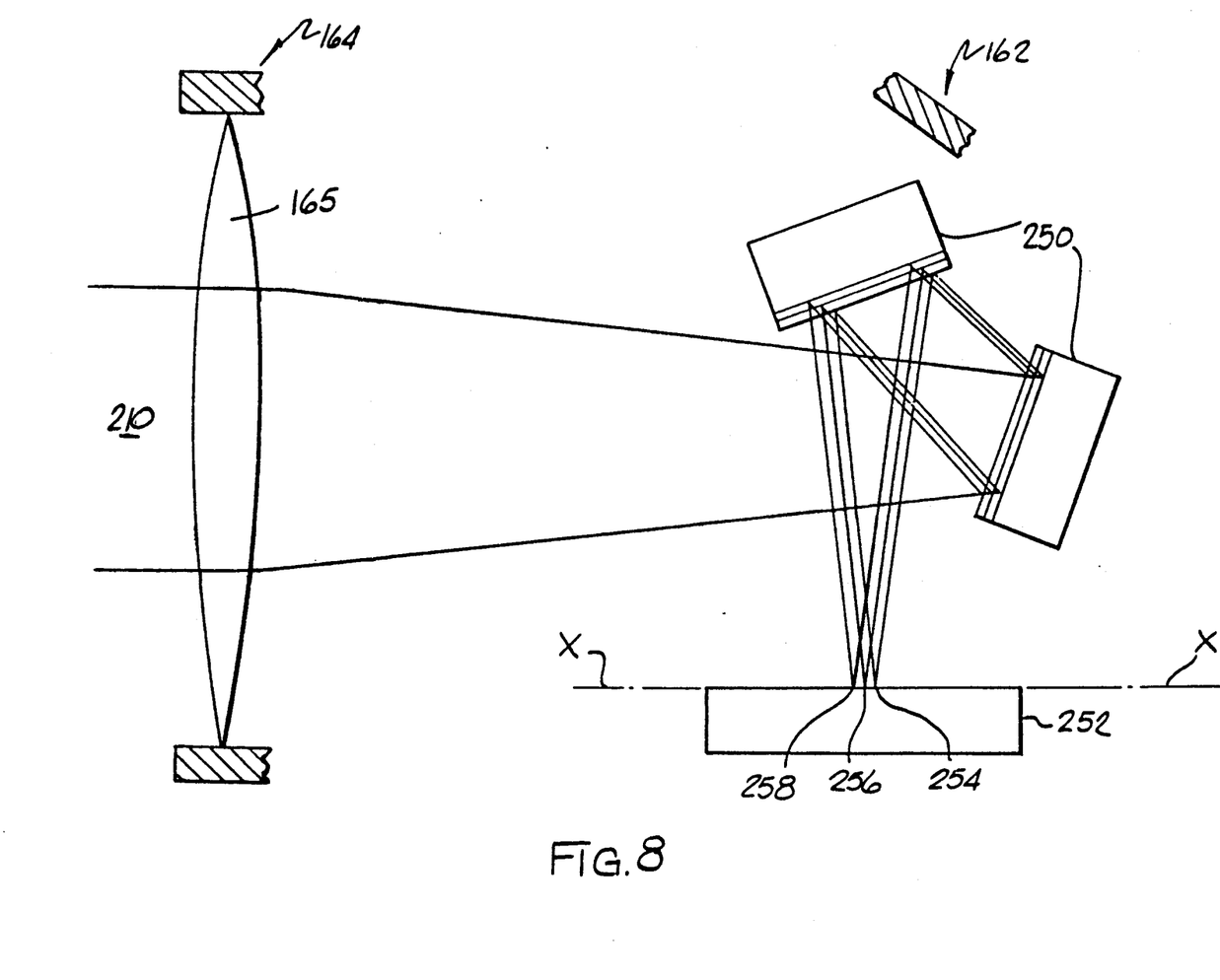
FIG. 8 is a schematic, side elevation view illustrating the operations of a focusing lens, beam splitter assembly, and photosensor assembly.
Figures 9, 10, 11:
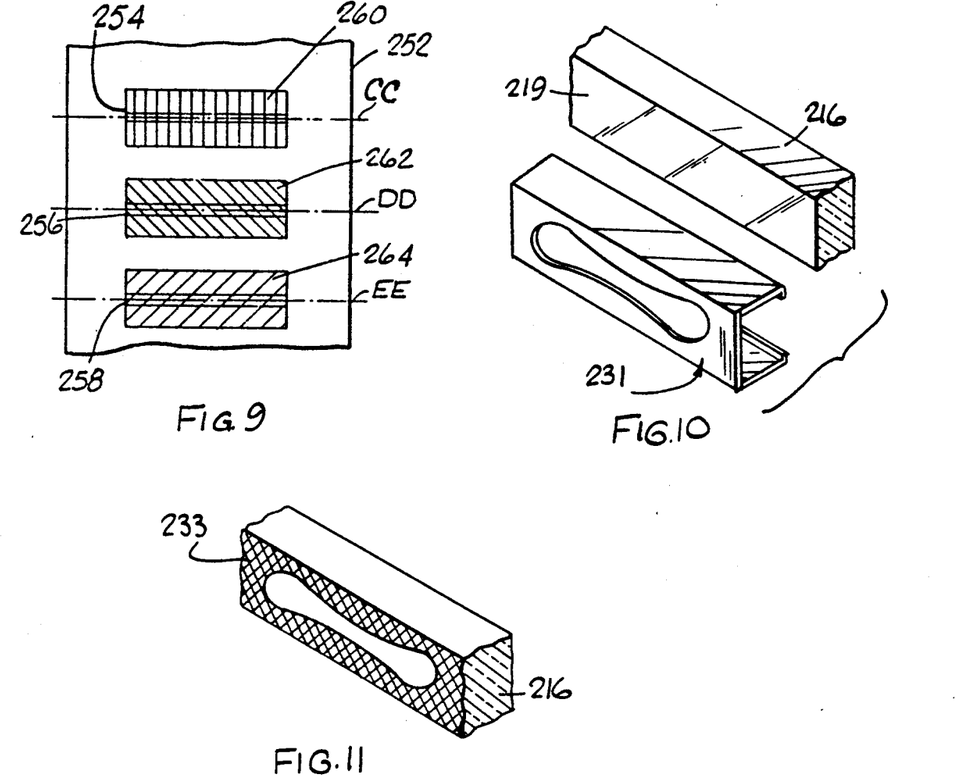
FIG. 9 is a top plan view of a photosensor assembly and color component line images projected thereon.
FIG. 10 is a perspective view of a snap-on occluding aperture stop and a mirror
FIG. 11 is a perspective view of a mirror having an aperture stop provided thereon by silk screening of the mirror surface.

FIGS. 1–6, 8 and 9 illustrate an optical scanner device 100 for producing machine-readable data representative of an image 260, FIG. 9, of a scan line object 206, FIGS. 6 and 7. The scanner device 100 comprises a light source 180, 184 for illuminating the scan line object 206 and a lens assembly 164 for focusing imaging light received from the scan line object 206 or an image plane XX at which a photosensor assembly 252 is located, FIG. 8. A plurality of mirrors 212, 214, 216, FIGS. 5 and 6, are provided for folding the light path 210 extending between the scan line object 206 and lens assembly 164. An occluding aperture stop 201 is positioned in immediately adjacent overlying relationship with the reflective surface, e.g. 217, of one of the mirrors, e.g. 214. The occluding aperture stop 201 has an aperture 213 of a selected shape which is adapted to differentially block light, in light path 210, emanating from different points across scan line object 206. This differential blocking of light with aperture stop 201 adjusts the light intensity of the image 260 of scan line object 206 which is produced on image plane XX. By mounting aperture stop 201 immediately adjacent to mirror surface 217, the problem of blocking the folded light path at multiple locations is obviated.

This problem of aperture stop impingement upon an adjacent light path portion is illustrated in phantom at 225. Occluding aperture stop 225 which is adapted to occlude light in light path portion 242 impinges on the upper edge of light path portion 244, thereby inappropriately blocking light therein. Such an aperture stop placement would result in improper light intensity adjustment at the image plane XX due to this impingement on light path portion 244.

Figures 12, 13, 14:
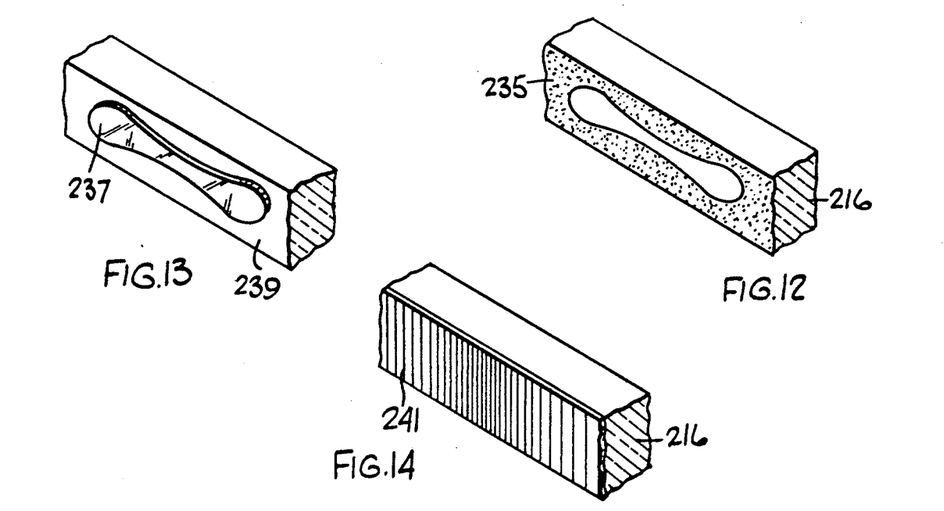
FIG. 12 is a perspective view of a mirror having an aperture stop provided thereon by etching of the mirror surface.
FIG. 13 is a perspective view of a shaped mirror mounted on a support block.
FIG. 14 is a perspective view of a mirror having a gradient filter plate attached to the surface thereof.

In one alternative embodiment of the scanner device 100, a gradient filter, e.g. 241, FIG. 14, which, like the aperture stop 201, is attached immediately adjacent a mirror surface, is used in place of the aperture stop 201. In another alternative embodiment, a shaped mirror surface 237, FIG. 13, is used rather than an aperture stop covered mirror surface.

Having thus described the optical scanning device 100 in general, the device will now be described in more specific detail.

Figure 1:
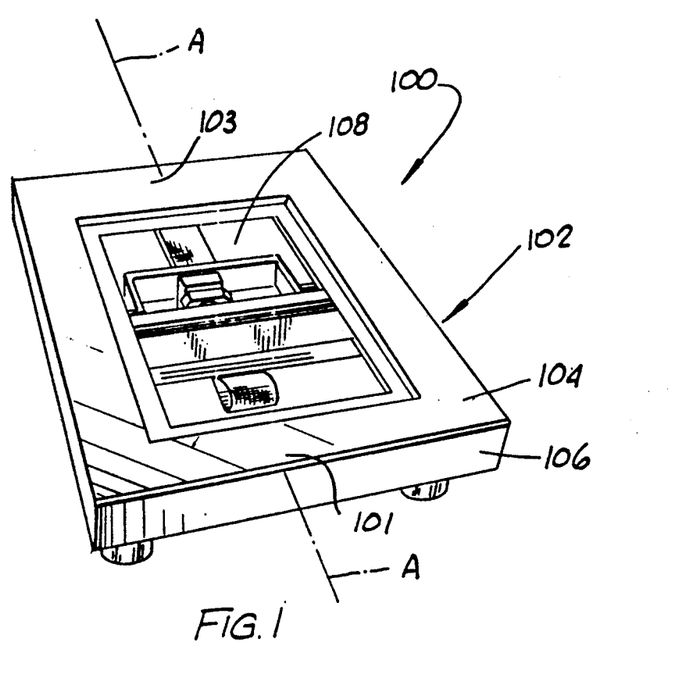
FIG. 1 is a perspective view of an optical scanner.

FIG. 1 illustrates an optical scanner 100 of a type adapted to produce machine readable data representative of a color image of an object which is scanned. The machine readable data produced by the optical scanner 100 is adapted to be received and used by a digital computer in a conventional manner, e.g. the data may be stored on a computer memory device or may be used to produce a color display of the object on a CRT or a color electrostatic print, etc.

Figure 2:
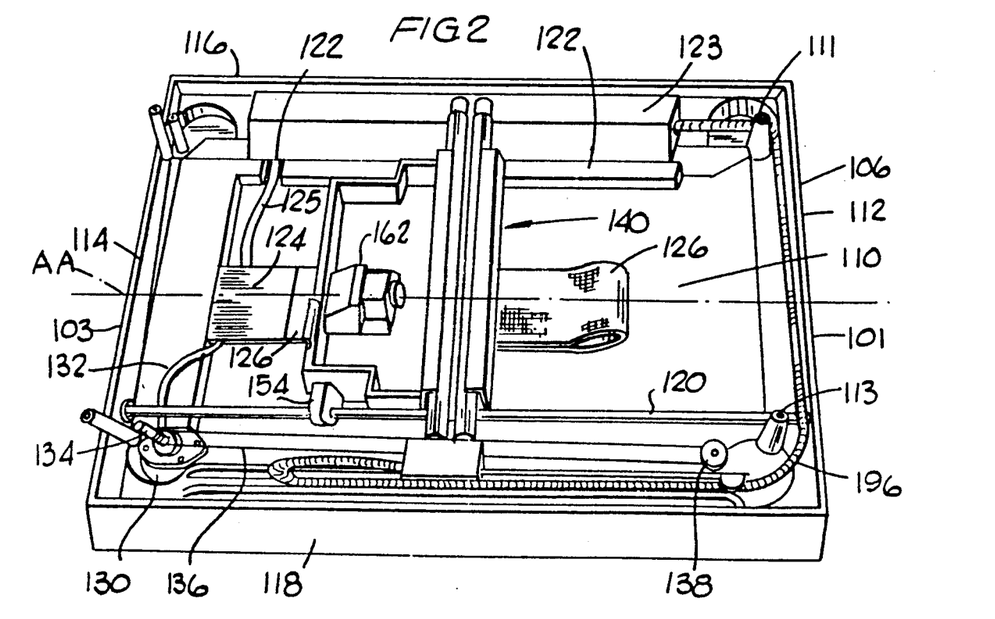
FIG. 2 is a perspective view of an optical scanner with an upper panel removed.

The optical scanner 100 comprises a scanner housing 102 having a forward end 101, a rear end 103 and a central longitudinal axis AA, FIGS. 1 and 2. The housing includes a relatively flat upper panel member 104 and a lower housing member 106, FIGS. 1 and 2. The upper panel member 104 comprises a transparent plate 108 which may be approximately laterally centered therein. The transparent plate 108 is positioned relatively nearer to the forward end 101 than the rear end 103 of the scanner housing. The forward edge of the transparent plate member 108 may be e.g. 72 mm from the forward terminal edge of the scanner housing. The rear edge of the transparent plate 108 may be e.g. 160 mm from the rear terminal edge of the scanner housing.

The lower housing member 106 comprises a generally rectangularly shaped bottom wall 110. A front wall 112, rear wall 114 and lateral sidewalls 116, 118 are integrally formed with the bottom wall 110 and project upwardly therefrom. Post members 111, 113 etc. are provided for attaching the upper panel member to the lower housing member. In one preferred embodiment of the invention the overall length of the housing is 575 mm, the lateral dimension of the housing is 408 mm and the distance from the bottom wall 110 to the upper panel member 104 is 105 mm.

As best illustrated in FIG. 2, a longitudinally extending shaft 120, which may be positioned e.g. 36 mm above the housing bottom wall 110 is supported at opposite ends thereof by brackets mounted on the front and rear housing walls 112, 114. Shaft 120 may be located 79 mm from lateral sidewall 118. A longitudinally extending riser 122, which may be integrally formed with the bottom wall 110 may be positioned e.g. 80 mm from lateral sidewall 116. The upper surface of the riser 122 may be positioned e.g. 37 mm above bottom wall 110.

As further illustrated in FIG. 2, an electrical power supply unit 123 is fixedly mounted to the lower housing member between sidewall 116 and riser 122. An electronic controller board 124 is fixedly mounted on bottom wall 110 at a rear end portion thereof. The controller board 124 receives power from power supply unit 123 through power cable 125. The controller board is electrically connected with a light processing assembly 162 mounted in a carriage assembly 140 through an electrical cable 126.

A reversible electric motor 130 which receives power through electrical supply cable 132 connected to controller board 124 is fixedly mounted the bottom wall at a location proximate lateral wall 118 at a rear end portion of the housing member. The reversible electric motor 130 has a vertical motor shaft 134 and is controlled by the controller board. A carriage assembly drive cable 136 has terminal ends thereof wound about vertical motor shaft 134. An intermediate portion of the cable 136 is received about a pulley 138 which is mounted proximate a forward end of the housing.

As best illustrated in FIG. 2, a scanner carriage assembly 140 is longitudinally displaceably mounted on shaft 120 and riser 122. The scanner carriage assembly 140 is attached to cable 136 which produces reciprocal, longitudinal movement thereof.

As best illustrated in FIG. 3, the scanner carriage assembly comprises a carriage body 142 which is preferably constructed from a rigid high strength material, such as aluminum, stainless steel or the like. The body comprises a bottom wall 144 having a two tier structure, including a forward upper tier 145 and rear lower tier 147, as illustrated in FIG. 6. The carriage has a vertical rear wall 146, a vertical first lateral sidewall 148 and a vertical second lateral sidewall 150, FIG. 3. The overall longitudinal dimension of carriage body 142 may be e.g. 146 mm. The maximum width of the carriage body 142 may be e.g. 244 mm.

First and second guide ring members 152, 154, FIGS. 2 and 3, are fixedly attached to the carriage body 142 and are adapted to slidingly receive longitudinally extending shaft 120. A vertically and longitudinally extending guide member 156, which may be integrally formed with lateral sidewall 150, is adapted to be positioned adjacent to an outboard portion of riser 122. The bottom wall 144 of the carriage body is slidingly supported on riser 122. Guide member 156 ensures proper longitudinal tracking of the carriage body 142 along the vertical riser 122.

A centrally mounted support block 160 is fixedly attached to bottom wall 144, FIG. 6. A light processing assembly 162 is fixedly attached to support block 160. The light processing assembly 162 in one preferred embodiment comprises a dual trichromatic beam splitter 250 and photosensor assembly 252, FIG. 8, which may be identical to the type described in U.S. Pat. No. 4,709,144 and 4,806,750 of Kent D. Vincent, and in U.S. Pat. No. 4,870,268 of Kent D. Vincent and Hans D. Neuman, each of which is hereby specifically incorporated by reference for all that is disclosed therein. A double convex lens assembly 164 is adjustably mounted at a position directly forward of light processing assembly 162 by a tubular mounting assembly 166. In one preferred embodiment of the invention the double convex lens 164 assembly comprises a lens 165, FIG. 8, having a 31 mm diameter, a 42 mm focal length, and a magnification of 0.126.

As best illustrated by FIGS. 4 and 6, a modular light source and light slit or aperture assembly 170 is stationarily mounted at a forward location on the carriage body 140. In the preferred embodiment of the invention illustrated by the drawings, the lateral sidewalls 148, 150 each comprise a forward cut-out region therein which define horizontal surfaces 172, 174 adapted to support assembly 170. A locking assembly 171 is associated with each support surface 172, 174 and is adapted to cooperate with a catch assembly (not shown) provided on a lower surface of the modular light source and light slit assembly 170 to hold assembly 170 in stationary relationship with the carriage body at a predetermined location thereon.

The modular light source and light slit assembly 170 comprises an elongate member 176 having a generally W-shaped cross-section, as shown by FIG. 6. The elongate member 176 has a forward portion 178 having generally U-shaped cross-section which is adapted for supporting a first fluorescent bulb 180 which may have a diameter of 15.5 mm. The elongate member 176 also comprises a rear portion 182 having a generally U-shaped cross-section for supporting a second fluorescent bulb 184. The elongated member 176 has a central riser portion 186. A narrow light slit or aperture 188 is located at the top of riser portion 186 and extends substantially the full length thereof. The light slit 188 communicates with a generally inverted V-shaped cavity 190 within the central riser portion 186. The inverted V-shaped cavity 190 also extends substantially the full length of the riser. The narrow slit 188 may comprise a length, measured transversely with respect to the housing longitudinal axis AA, of 234 mm. The slit width, measured parallel to axis AA, may be e.g. 0.8 mm. The inverted V-shaped cavity may have a width at the upper end thereof of e.g. 0.8 mm and a width at the bottom end thereof of e.g. 7.5 mm and may have a height of e.g. 215 mm. The surface of the inverted V-shaped cavity 190 may have a generally inverted stair step shape, each inverted stair step having a height of e.g. 2 mm and a horizontal dimension of, e.g., 0.2 mm. An electrical socket member 194, FIG. 4, is fixedly attached to one end of elongate member 176 and comprises two conventional fluorescent bulb female sockets therein adapted to receive conventional male socket portions of fluorescent bulbs 180 and 184, respectively. A flexible power cable 196 is operably attached to socket member 194 for providing electrical current to bulbs 180, 184. Independent end sockets 198, 200 are provided at the end of each fluorescent bulb and make electrical contact with male socket portions thereof. Each socket 198, 200 is connected by a pair of lead wires 202, 204 to an associated portion of socket member 194. Shield members 193, 195 (shown in FIG. 6 only) may be provided to reflect light from the bulbs 180, 184 toward an object such as color document 208, which is to be scanned.

Light slit 188 passes light reflected from a narrow band region 206 of document 208 and blocks all other light reflected from the document. The region 206 from which light is reflected of course changes as scanner carriage assembly 140 moves relative to document 208. However, for purposes of explaining image formation, etc., it is helpful to visualize the scanner carriage assembly 140 and narrow band region 206 in a static position. Narrow band region 206 is sometimes referred to herein as "scan object" or "scan line object" 206.

As illustrated by FIG. 6, some of the light from fluorescent bulbs 180, 184, which is reflected from a narrow band scan region 206 of document 208 and which ultimately enters lens 165 travels along a light path 210 which passes through slit 188 and inverted V-shaped cavity 190. Light path 210 is thereafter "folded" by a first mirror 212, a second mirror 214 and a third mirror 216 having reflective mirror surfaces 215, 217, 219, respectively, before passing through focusing lens 165. Light path 210 thereafter passes through tubular member 166 into light processing assembly 162 and terminates at photosensor assembly 252 therein, FIG. 8. Each mirror 212, 214, 216 may have a width of e.g. 127 mm and is held in position by a pair of mounting assemblies, e.g. 220, 221, FIG. 5, which may comprise a bracket member 222 which is fixedly attached to an associated lateral sidewall of the carriage assembly and a clip member 224 which attaches an end portion of each mirror to the associated bracket members 222. In the case of mirror 214, a mirror angular adjustment assembly 226 is also provided for adjusting the relative angular position of mirror 214 about an axis extending perpendicularly of axis AA. The mirror mounting assemblies may be identical to those which are specifically described in U.S. patent application Ser. No. 345,384, filed May 1, 1989, of David Wayne Boyd, which is hereby specifically incorporated by reference for all that is disclosed therein.

As best illustrated in FIGS. 5 and 6, light path 210 is a folded light path comprising a first vertically downwardly extending light path portion 238 extending between scanned document 208 and light slit 188; a second vertically downwardly extending light path portion 240 extending from slit 188 to mirror 212; a third generally rearwardly and upwardly extending light path portion 242 extending between mirror 212 and mirror 214; a fourth generally downwardly and forwardly extending light path portion 244 extending between mirror 214 and mirror 216; and a fifth generally rearwardly extending light path portion 246 extending between mirror 216 and the forward surface of lens 165.

In one preferred embodiment of the invention the length of first light path portion 238 is 6.0 mm; the length of the second light path portion 240 is 35.7 mm; the length of the third light path portion 242 is 124.4 mm; the length of the fourth light path portion 244 is 32.8 mm; and the length of the fifth light path portion 246 is 61.0 mm. The inclination of the first and second light path portions with respect to a vertical plane BB may be 0 degrees. The inclination of the center line of the third light path portion 242 with respect to vertical plane BB may be 80.6 degrees, the inclination of the fourth light path portion 244 with respect to vertical plane BB may be 71.3 degrees, and the inclination of a fifth light path portion 246 with respect to vertical plane BB may be 90 degrees.

The lateral convergence of the light path with respect to the field of view of lens 164 is best illustrated in FIG. 5. This lateral convergence may be from a dimension of 212 mm at a point where light enters slit 188 to a lateral dimension of 190 mm at the first mirror 212, to a lateral dimension of 114 mm at the second mirror 214, to a lateral dimension of 33 mm at the third mirror 216, to a lateral dimension of 10 mm at the forward surface of lens 165. The breadth (the dimension corresponding to the width of slit 188) of the light path viewed by lens 164 increases as it travels from slit 188 to the forward surface of the lens from a dimension of 0.8 mm at slit 188 to a dimension of 1.05 mm at the first mirror 212, to a dimension of 4.5 mm at the second mirror 214, to a dimension of 8.2 mm at the third mirror 216, to a dimension of 10 mm at the forward surface of lens 164.

As illustrated in FIGS. 3-6, a snap-on light occluding aperture stop assembly 201 may be mounted on mirror 214. By mounting aperture stop assembly 201 directly on mirror 214, problems associated with blocking light at more than one location along the light path, such as would be encountered if an aperture stop were mounted at the location shown in phantom at 225 in FIG. 6, are eliminated.

Aperture assembly 201 occludes the light in light path 210 to correct the light intensity across the scan image 260, 262, 265 produced on the image plane XX by light processing assembly 162 which is described below. The use of occluding aperture stops in line-focus optic systems and methods for choosing an appropriate aperture shape are described in U.S. patent application Ser. No. 389,033 filed Aug. 3, 1989, which is hereby specifically incorporated by reference for all that it discloses.

The aperture stop assembly 201 comprises an integrally formed, opaque member having a flat central body portion 203 and parallel, opposite leg portions 205, 207 which are integrally attached to the central body portion 203. Inwardly projecting flange portions 209, 211 are provided at the distal end of each leg portion. An aperture 213 is provided in flat central body portion 203 and may be of a shape determined by the aperture sizing method described in U.S. Pat. application Ser. No. 389,033 incorporated by reference above or by other appropriate sizing techniques.

Rather than providing an aperture stop assembly on mirror 214, the aperture stop may be placed on one of the other mirrors 212, 216. As illustrated in FIG. 10, an aperture stop assembly 231 designed to be placed on mirror 216 may be considerably more laterally compact than that needed for mirror 214 due to the smaller lateral dimensions of the light path at mirror 216 than at mirror 214.

As an alternative to providing the aperture stop in the form of a clip-on member such as member 201 or 231, the aperture stop may comprise an opaque medium such as black ink which is silk-screened onto a mirror surface, e.g. mirror 216 surface 219, to define a predetermined aperture configuration. Such a silk-screened aperture stop 233 is shown in FIG. 11.

In another embodiment, the aperture stop is provided by etching a mirror surface. An etched aperture stop 235 provided on mirror 216 is shown in FIG. 12.

In another embodiment, a shaped mirror surface 237 is provided on a suitable nonreflective support surface 239 in which case the occluding aperture stop is provided, in effect, by the selected absence of reflective surface provided by the shaped mirror surface 237.

In a somewhat different embodiment of the invention, the light occluding function performed by an aperture stop is performed instead by a gradient filter 241 which is applied to the surface of one of the mirrors, e.g. mirror 216. The gradient filter is selected to occlude the same amount of light associated with the different regions along the line object 206 as that which would be occluded by an aperture stop. Methods for creating gradient filters of selected light occluding properties are known in the art. The light occluding filter may be provided by applying a filter medium coating directly to a mirror surface or, alternatively, as illustrated in FIG. 14, by attaching a filter plate to a mirror surface.

As illustrated schematically by FIG. 8, light processing assembly 162 comprises a dual chromatic beam splitter 250 and a photosensor assembly 252 which may be identical to the beam splitter and photosensor array described with reference to FIG. 18 in U.S. Pat. No. 4,870,260 of Vincent et al., which is specifically incorporated by reference for all that it discloses. The photosensor assembly 252, as shown in FIG. 9, comprises three spaced apart, parallel, linear photosensor arrays 254, 256, 258 having longitudinal axes CC, DD, EE which are located in a common photosensor plane XX, FIG. 8. The beam splitter 250 is disposed within light path 210 at the rear of lens 165. The beam splitter 250 bends the composite light beam traveling along light path 210 90° and separates it into parallel red, green, and blue component beams. The photosensor assembly is positioned perpendicular to the paths of the component beams at one focal length distance from the lens (as measured along the light path). A red component image 260 of the scan object 206 is projected onto the photosensor assembly 252 in overlying relationship with linear photosensor array 254 as shown in FIG. 9. A green component image 262 of scan object 206 is projected onto the photosensor assembly in overlying relationship with linear photosensor array 256. A blue component image 264 of the scan object 206 is projected onto the photosensor assembly in overlying relationship with linear photosensor array 258.

Each linear photosensor array 254, 256, 258 produce an electronic signal which is interpreted by the scanner data processing system (not shown), as being representative of the color of the particular component image which is designed to overlie that particular linear photosensor array.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical scanner device for producing machine-readable data representative of an image of a scan line object, comprising:
    (a) light source means for illuminating the scan line object;
    (b) lens means for focusing imaging light received from the scan line object on an image plane;
    (c) at least one mirror means having a planar mirror surface for reflectively directing imaging light from the scan line object into said lens means whereby a folded imaging light path extending between the scan line object and said lens means is provided, said imaging light path being folded at an acute angle at said planar mirror surface; and
    (d) occluding aperture stop means positioned in immediately adjacent, overlying relationship with said mirror surface for selectively differentially blocking light in said light path emanating from different points across the scan line object for adjusting the light intensity of the image produced on the image plane whereby blocking of light with said occluding aperture stop means at more than one location along said folded imaging light path is obviated.

2. The invention of claim 1 wherein said occluding aperture stop means comprises an opaque member attached to said mirror means in overlying relationship with said mirror surface, said opaque member having an aperture defining window therein of a predetermined configuration.

3. The invention of claim 2 further comprising clip means operably associated with said opaque member for clippingly attaching said opaque member to said mirror means.

4. The invention of claim 3, said opaque member comprising a flat central body portion in which said window is provided.

5. The invention of claim 4, said clip means comprising an integrally formed portion of said opaque member.

6. The invention of claim 5, said clip means comprising leg portions projecting from opposite edge portions of said flat central body portion.

7. The invention of claim 1, said aperture stop means comprising an opaque medium applied to a selected surface portion of said mirror means in a predetermined configuration.

8. The invention of claim 1, said aperture stop means comprising an etched surface portion of said mirror means of a predetermined configuration.

9. An optical scanner device for producing machine-readable data representative of an image of a scan line object, comprising:
 (a) light source means for illuminating the scan line object;
 (b) lens means for focusing imaging light received from the scan line object on an image plane;
 (c) at least one mirror means having a planar mirror surface for relfectively directing imaging light from the scan line object into a lens means whereby a folded imaging light path extending between the scan line object and said lens means is provided, said imaging light path being folded at an acute angle at said planar mirror surface; and
 (d) occluding gradient filter means applied directly to said mirror surface for selectively differentially filtering light emanating from different points across the scan line object for adjusting the light intensity of the image provided on the image plane whereby filtering of light with said gradient filter means at more than one location along said folded imaging light path is obviated.

10. The invention of claim 9, said occluding gradient filter means comprising a filter plate attached to said mirror means in overlying relationship with said mirror surface.

11. An optical system for producing an image of a scan line object on an image plane comprising:
 (a) light source means for illuminating the scan line object;
 (b) lens means for focusing an image of the scan line object on an image plane; and
 (c) a shaped mirror surface of a predetermined surface configuration for folding at an acute angle an imaging light path extending between the scan line object and said lens means and for differentially transmitting light in the imaging light path emanating from different points on the scan line object for adjusting the intensity of the image on the image plane.

12. A method of controlling light intensity of an image produced on a linear photosensor array in an optical scanning system, comprising:
 (a) configuring a reflective mirror surface in a selected shape adapted to discriminatingly transmit imaging light emanating from different spacial locations on a scan line object in accordance with predetermined light transmitting properties of the optical scanning system so as to properly balance the light intensity of an image produced at said linear photosensor array;
 (b) directing imaging light onto said reflective mirror surface;
 (c) reflecting said imaging light from said reflective mirror surface at an acute angle; and
 (d) focusing imaging light reflected from said reflective mirror surface on said linear sensor array.

13. A method of controlling light intensity of an image produced on a linear photosensor array in an optical scanning system, comprising:
 (a) applying to a reflective mirror surface a gradient filter which is adapted to discriminatingly filter light emanating from different spacial locations on a scan line object in accordance with predetermined light transmitting properties of the optical scanning system so as to properly balance the light intensity of an image produced at said linear photosensor array;
 (b) directing imaging light through said gradient filter and onto said reflective mirror surface to which said gradient filter has been applied;
 (c) reflecting said imaging light from said reflective mirror surface at an acute angle; and
 (d) focusing said imaging light reflected from said reflective mirror surface on said linear sensor array.

* * * * *